(12) United States Patent
Tsui et al.

(10) Patent No.: US 9,768,812 B1
(45) Date of Patent: Sep. 19, 2017

(54) FACILITATION OF PASSIVE INTERMODULATION CANCELLATION

(71) Applicant: AT&T Intellectual Property I, L.P., Atlanta, GA (US)

(72) Inventors: Ernest Tsui, Pleasanton, CA (US); Paul Maxwell, Piedmont, CA (US); Vibhav Kapnadak, Milpitas, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/179,427

(22) Filed: Jun. 10, 2016

(51) Int. Cl.
*H04B 1/10* (2006.01)
*H04B 17/391* (2015.01)

(52) U.S. Cl.
CPC ........... *H04B 1/1027* (2013.01); *H04B 1/109* (2013.01); *H04B 17/391* (2015.01); *H04B 1/1081* (2013.01)

(58) Field of Classification Search
CPC ..... H04B 1/1027; H04B 17/391; H04B 1/109
USPC ........................................................ 375/227
See application file for complete search history.

(56) References Cited

U.S. PATENT DOCUMENTS

| | | | |
|---|---|---|---|
| 5,365,516 A | 11/1994 | Jandrell | |
| 6,233,434 B1 * | 5/2001 | Takei | H01Q 1/246 455/103 |
| 8,369,812 B2 | 2/2013 | Lehman | |
| 8,666,322 B1 | 3/2014 | Bradley et al. | |
| 8,831,593 B2 | 9/2014 | Melester et al. | |
| 8,855,175 B2 | 10/2014 | Wyville et al. | |
| 8,903,324 B1 | 12/2014 | Bradley | |
| 8,983,454 B2 | 3/2015 | Bevan et al. | |
| 9,026,064 B2 | 5/2015 | Wang et al. | |
| 2003/0232600 A1 | 12/2003 | Montgomery et al. | |
| 2012/0295558 A1 * | 11/2012 | Wang | H04B 1/109 455/79 |

(Continued)

FOREIGN PATENT DOCUMENTS

| | | |
|---|---|---|
| WO | 2014166229 A1 | 10/2014 |
| WO | 2016059424 A1 | 4/2016 |

OTHER PUBLICATIONS

Wilkerson et al., "Passive Intermodulation Distortion in Antennas," IEEE Transactions on Antennas and Propagation, Feb. 2015, pp. 474-482, vol. 63, No. 2, IEEE.

(Continued)

*Primary Examiner* — Helene Tayong
(74) *Attorney, Agent, or Firm* — Amin, Turocy & Watson, LLP

(57) ABSTRACT

A passive intermodulation detection system is provided to remotely identify passive intermodulation at a base station site and diagnose the type of intermodulation and location of the non-linearity that is the source of the passive intermodulation. The passive intermodulation detection system can generate a test signal in a first band that is transmitted by an antenna. Another antenna can receive a signal in another band, and the passive intermodulation detection system can analyze the received signal to determine whether an intermodulation product due to a non-linearity is present. Based on the type of intermodulation product, period, order, frequency, and etc, the type and location of the non-linearity can be identified and canceled via a passive intermodulation canceling mechanism.

20 Claims, 11 Drawing Sheets

(56) References Cited

U.S. PATENT DOCUMENTS

| | | | |
|---|---|---|---|
| 2013/0044791 A1* | 2/2013 | Rimini | H04B 1/109 375/219 |
| 2013/0054169 A1* | 2/2013 | Neidhardt | H04B 17/0085 702/69 |
| 2013/0310023 A1 | 11/2013 | Bevan et al. | |
| 2013/0322395 A1 | 12/2013 | Kazmi et al. | |
| 2014/0119197 A1* | 5/2014 | Maca | H04B 17/0085 370/241 |
| 2014/0153418 A1 | 6/2014 | Hariharan et al. | |
| 2014/0161005 A1 | 6/2014 | Laurent-Michel | |
| 2014/0242930 A1 | 8/2014 | Barker et al. | |
| 2014/0294052 A1 | 10/2014 | Currivan et al. | |
| 2014/0378067 A1 | 12/2014 | Au | |
| 2015/0087242 A1 | 3/2015 | Bain et al. | |
| 2015/0145528 A1 | 5/2015 | Yeo et al. | |
| 2015/0222371 A1 | 8/2015 | Afkhami et al. | |
| 2015/0244414 A1 | 8/2015 | Yu et al. | |
| 2015/0249965 A1 | 9/2015 | Dussmann et al. | |
| 2015/0318882 A1 | 11/2015 | Wyville | |
| 2015/0350940 A1 | 12/2015 | Wilson et al. | |
| 2015/0358144 A1 | 12/2015 | Fleischer et al. | |
| 2016/0006468 A1* | 1/2016 | Gale | H04B 1/123 455/296 |
| 2016/0028497 A1 | 1/2016 | Holt et al. | |
| 2016/0072591 A1 | 3/2016 | Tu et al. | |

OTHER PUBLICATIONS

Yang et al., "PIM Interference Testing Methods of Satellite Communication Components and Setting up of the Testing System," General Assembly and Scientific Symposium (URSI GASS), 2014, IEEE, 4 pages.

Tarlazzi, "PIM Requirements Must Increase to Support Evolving DAS Systems", Commscope, Aug. 2014, 16 pgs.

Cannon, "Troubleshooting Passive Intermodulation Problems in the Field", Anritsu America, http://www.anritsu.com/EnUS/ProductsSolutions/Solution/Troubleshootingpassiveintermodulation.aspx, last accessed Mar. 19, 2015, 4 pgs.

Office Action for U.S. Appl. No. 14/734,766 dated Jan. 26, 2017, 58 pages.

* cited by examiner

FACILITATION OF PASSIVE INTERMODULATION CANCELLATION

TECHNICAL FIELD

This disclosure relates generally to facilitating the cancellation of passive intermodulation for antennas.

BACKGROUND

Intermodulation is the amplitude modulation of signals containing two or more different frequencies in a system with non-linearities that results in signal noise. The intermodulation between each frequency component can form additional signals at frequencies that are harmonic frequencies and sum and difference frequencies of the original frequencies and multiples thereof. The non-linearities can be cause by junctions in the physical equipment (cables, antennas), as well as by sources in the surrounding environment. This type intermodulation, caused by non-active components, is called external (in the sense the passive intermodulation sources are external to the cabling/antenna system) passive intermodulation and can be difficult and costly to diagnose as site visits by skilled technicians are traditionally used to detect and identify the non-linearity source locations.

The above-described background relating to intermodulation is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
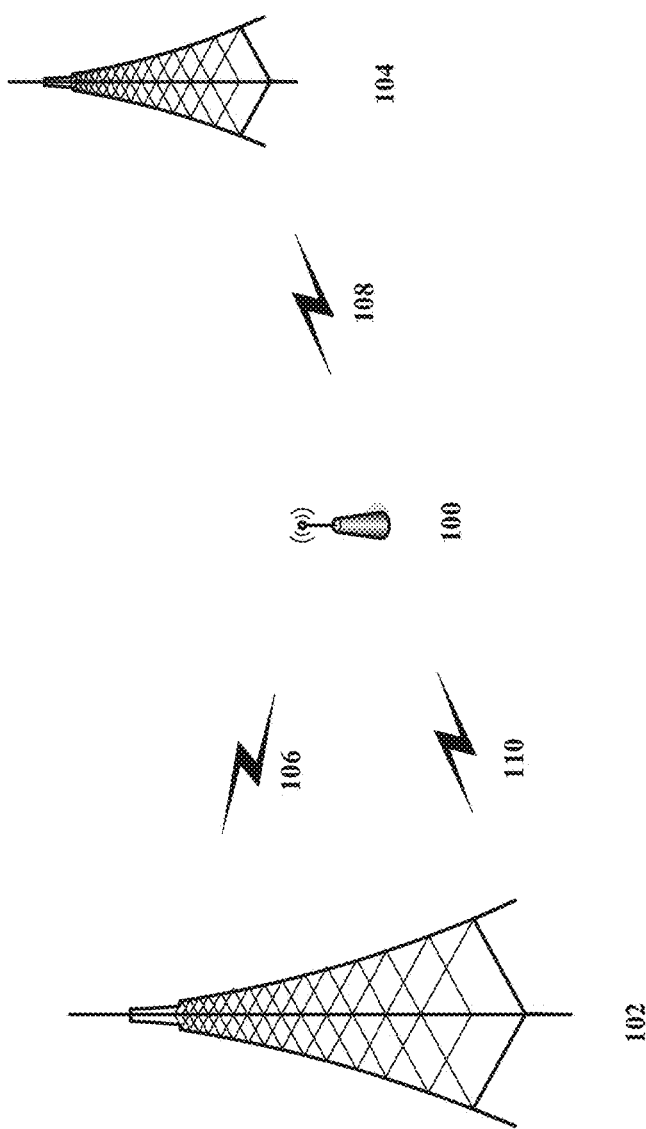
FIG. 1 illustrates an example wireless network comprising passive intermodulation cancellation according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate passive intermodulation cancellation between network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate passive intermodulation cancellation. A passive intermodulation detection system can remotely identify passive intermodulation at a base station site and diagnose the type of intermodulation and location of the non-linearity that is the source of the passive intermodulation. The passive intermodulation detection system can generate a test signal in a first band that is transmitted by an antenna. Another antenna or the same antenna can receive a signal in another band, and the passive intermodulation detection system can analyze the received signal to determine whether an intermodulation product due to an external or internal non-linearity is present. Based on the type of intermodulation product, period, order, frequency, etc., the type (internal or external or both), magnitude, and location of the non-linearity can be identified.

The passive intermodulation detection system can also distinguish passive intermodulation noise from adjacent channel interference. The remote passive intermodulation test can generate a test signal that simulates a cellular signal at full or partial load and that does not impact existing customer site connections and usage so that the test can be performed while the base station device/cell tower is in service. Furthermore, using test signals that simulate spectrum-rich cellular transmissions can generate intermodulation products that would be generated during real-time use unlike single tone test signals of traditional passive intermodulation testers.

Once the characteristics of the passive intermodulation are discovered and analyzed via test signals or real-time, this information can then be used to effectively cancel the effect of the nonlinearities by use of the known characteristics of the test signals and the estimated characteristics of the nonlinearity sources.

To cancel a reflected signal, the non-linearity, the multipath to the passive intermodulation (PIM) source, the reflected signal multipath, and the reception filtering can be modeled with an adaptive learning filter. A downlink from two different bands can transmit two polarizations each (F1 at +/−45°) and (F2 at +/45°), which can generate four products. Each product can be tested separately to determine which product dominates in order to simplify the cancellation and the conversion from a non-linear system into a linear system. When there is a single band, the test can determine an internal PIM, but the test can also determine an external PIM for the single band by isolating the band to determine if there is any intermodulation on the band. Respectively, a dual antenna system with adequate isolation can determine intermodulation for two bands.

Generally, a third order product from a PIM non-linearity is the strongest. Therefore, canceling the third order product can be the priority. However, it should be noted that any other order could potentially be stronger than the third order product. Therefore, any other order can be selected for cancellation. The products can comprise transmission signals and complex amplitude and phase adjustments, wherein the transmissions ports can generate multiple frequency bands. For example, a PIM source can be modeled to the third order and give the following in-band products for a band 17 uplink:

$$(Ka \times 29H)^3 + (Kd \times 29V)^3 + [(Kc \times 29H) \times (Kd \times 29V)]^3 + \\ [(Ka \times 17H)(Kc \times 29H)]^2 + (Ka \times 7V) \times (Kd \times 29V)^2 + \\ (Ka \times 17H) \times (Kd \times 29V)^2 + (Kb \times 17V) \times (Kc \times 29H)^2 \quad \text{Eqn (1)}$$

The band 17 self-products can be ignored since they are far away in frequency (but for completeness, they can appear exactly like the band 29 above except 29 is replaced by 17).

The PIM can be modeled to determine the largest intermodulation that impacts the band 17 uplink by placing the third order intermodulation products into the desired signal. The average magnitude of the third order intermodulation product components can be calculated and ranked based on the signal plus interference noise ratio/physical resource block bandwidth. Thereafter, the two highest values can be input into the canceller system. However, it should be noted that one PIM or several PIMs can be cancelled simultaneously.

The IM system model can comprise a finite impulse response filter and/or an infinite response filter. The filter can model IM signal products of a downlink band that was reflected back to account for the interference coming back from a signal that might have been delayed by intercepting an object in its path. The interference could also have a frequency and/or time offset. After the PIM signal is processed through the filter, White Gaussian Noise (AWGN) and a desired signal (another uplink signal) can be added to the filtered signal.

A learning filter can also receive the modeled PIM signal and produce another output that will be added to the AWGN, a desired signal (another uplink signal), and the filtered signal, resulting in an error output. The error output coming out of finite impulse response filter can be placed through the learning filter to ultimately converge with the finite impulse response output. The learning filter can also account for any time delay due to propagation variance associated with time. The cancelling system model can also comprise a pre-filter to model the known properties of any uplink filter to avoid additional adaptive filter taps associated with the learning filter that can increase complexity and slow convergence. The pre-filter can also model the reception antenna and filter.

For these considerations as well as other considerations, in one or more embodiments, a system comprises a processor and a memory that stores executable instructions that when executed by the processor, facilitate performance of operations, comprising cycling a test signal at a defined rate, wherein the test signal is in a first band and is transmitted by a transmitter. The operations also comprise receiving a transmission in a second band by a receiver. The operations also comprise determining that an intermodulation product from the test signal is present in the transmission based on matching a cyclical noise measurement of the transmission to the defined rate. The operations can also comprise cancelling the PIM associated with the test signal.

In one embodiment, described herein is a method comprising receiving first signal data related to a signal band, resulting in a first received signal, and filtering interference data related to an interference of the first received signal. Second signal data related to a second signal can be received, and error output data related to a signal error associated with the interference can be generated, wherein the error output data further comprises a representation of the second signal. Thereafter, the error output data can be processed, resulting in processed error output data; and the processed error output data can be input to the first filter.

According to another embodiment, a system can facilitate, receiving first signal data associated with a first downlink of a first signal band, and receiving second signal data associated with a second downlink of a second signal band. The system can filter, via a first filter, first interference data related to a first interference associated with the first signal data and the second signal data, resulting in first filtered data. The system can also receive third signal data related to a defined signal, and filter, via a second filter, the first interference data related to the first interference associated with the first signal data and the second signal data, resulting in second filtered data. Thereafter, the system can generate error output data related to a signal error associated with the first signal band and the second signal band, wherein the error output data comprises the first filtered data, the second filtered data, and the third signal data; and in response to the generating the error output data, the system can process, by the second filter, the error output data to be sent as an input to the first filter.

According to yet another embodiment, described herein is a machine-readable storage medium that can perform the operations comprising receiving first signal data related to a signal band, resulting in a first received signal, and filtering, by a first filter, interference data related to an interference of the first received signal, resulting in first filtered data. The machine-readable storage medium can then receive second signal data related to a desired signal, and generate error output data related to a signal error associated with the interference. Consequently, the machine-readable storage medium can filter, by a second filter, model data related to a representation of the first filtered data and the desired signal, resulting in second filtered data, and input the error output data and the second filtered data into a third filter.

These and other embodiments or implementations are described in more detail below with reference to the drawings.

Referring now to FIG. 1, illustrated is an example wireless network comprising passive intermodulation cancellation according to one or more embodiments. A passive intermodulation source 100 can reflect transmission signals 106, 108 from antennas 102, 104. For example, reflected transmission signal 110 can be reflected to the antenna 102 in response to the passive intermodulation cancellation source receiving the transmission signals 106, 108. Additionally, it should be noted that various bands can be associated with the transmission signals 106, 108. For example, the reception antenna 102 can be associated with band 17 thereby associating band 17 with the transmission signal 106, and the reception antenna 104 can be associated with band 29 thereby associating band 29 with the transmission signal 108. To cancel the reflected transmission signal 110, the non-linearity of the passive intermodulation source 100, the multipath to the passive intermodulation source 100, the reflected transmission signal 110 multipath, and the reception filtering can be modeled with an adaptive learning filter. Additionally, in an alternate embodiment, pre-passive intermodulation can be omitted during the modeling.

Figure 2:
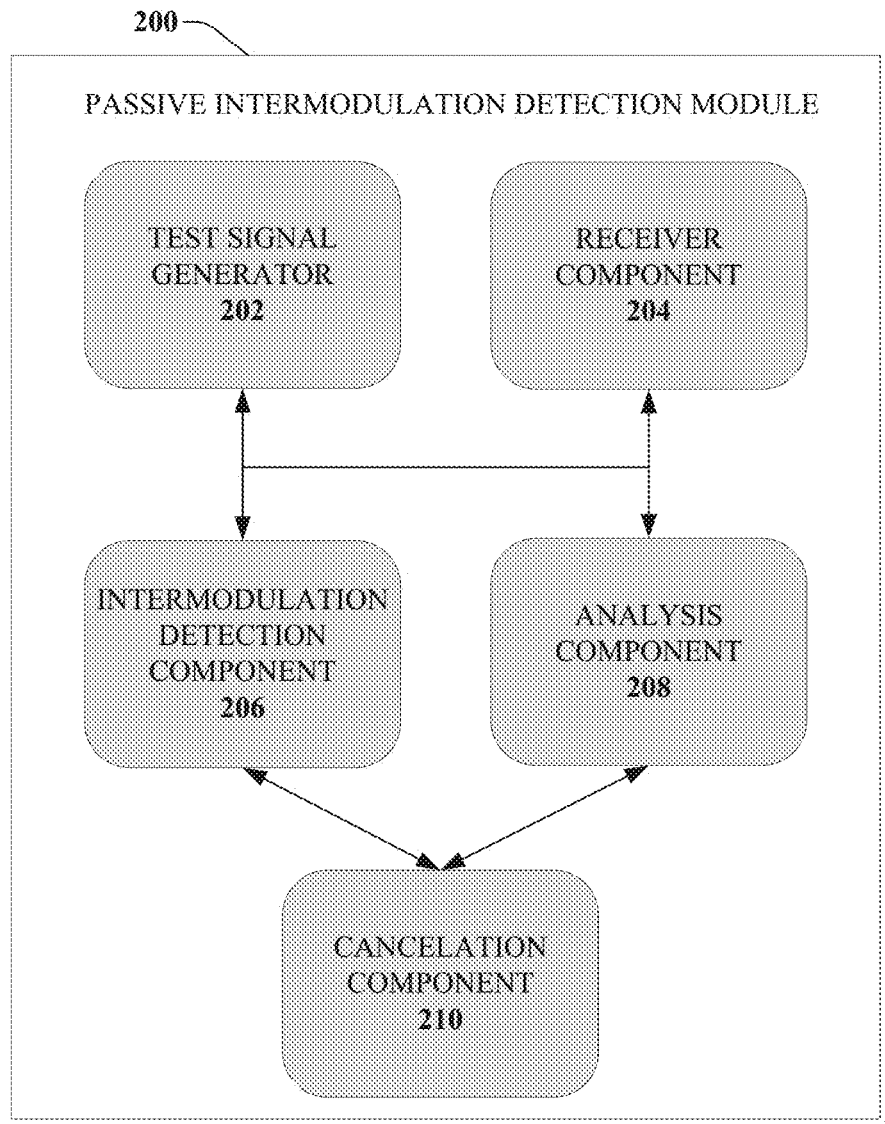
FIG. 2 illustrates an example wireless network performing passive intermodulation detection according to one or more embodiments.

Referring now to FIG. 2, illustrated is an example wireless network performing passive intermodulation detection according to one or more embodiments. A base station site (e.g., a cell tower or other location where a base station device can be located) can include one or more remote radio heads that can send transmissions to one or more mobile devices that are located within range of the base station site. Non-linearities in passive elements (e.g., antennas, cabling, junctions between materials, etc) can cause passive intermodulation when two or more high power tones mix at the nonlinearities (e.g., junctions of dissimilar metals, rust, and even loose connectors).

Passive intermodulation detection module 200 can be configured to detect passive intermodulation caused by nonlinearities at the cell site. A test signal generator 202 can generate a test signal that can be transmitted by an antenna. The test signal can be a signal that includes transmissions at a plurality of frequencies simulating a transmission sent by the remote radio during normal operations. The test signal generator 202 can cycle the test signal at a defined rate and the test signal can be in a first band. Receiver component 204 can receive, via another antenna, a transmission in a second band. The test signal can be in a downlink band, while signals received by the receiver component 204 can be from a mobile device in an uplink band.

An intermodulation detection component 206 can detect whether the signal, as received by the receiver component 204 includes any intermodulation products from passive intermodulation. In an embodiment, the intermodulation detection component 206 can determine that an intermodulation product from the test signal is present in the transmission based on matching a cyclical noise measurement of the transmission to the defined rate of the test signal. The intermodulation detection component 206 can also distinguish the intermodulation product from adjacent channel interference associated with a signal on an adjacent channel based on the slope of the noise amplitude as a function of frequency. The further the frequency is from the adjacent band, the noise amplitude decreases. By contrast, the intermodulation product from the passive intermodulation has harmonics that show up as increases at regular frequency intervals.

The analysis component 208 can determine a type of a source of non-linearity based on an amplitude and a period of the intermodulation product. This can also determine characteristics of the nonlinearity for use in possible cancellation. The analysis component 208 can also determine a location of the source of non-linearity based on a time delay between the intermodulation product and the test signal. The analysis component 208 can also generate a model of the intermodulation products created by the non-linearity that is predictive of intermodulation products in different contexts (band, frequency, amplitude, etc). This model can then be used by the analysis component 208 to modify or otherwise process transmissions to mitigate the intermodulation product on transmissions received by receiver component 204.

The intermodulation detection component 206 and the analysis component 208 can send their outputs to a cancellation component 210 to cancel reflected signals. The cancellation component 210 can comprise a finite impulse response filter or an infinite impulse response filter to filter out products of the downlink band that were reflected back. The filtering tries to account for interference associated with a signal that might have been delay by hitting an object (i.e. a bolt). However, the interference could also have a frequency and/or a time offset. White Gaussian Noise can also be added to the cancellation component 210 to assist with the modeling.

The cancellation component 210 can also comprise a learning filter, which can be a finite impulse response filter and/or an infinite impulse response filter. The error output coming from the other finite impulse response filter can be placed through this learning filter to ultimately converge with the previous finite impulse response filter. The learning filter can also account for a time delay because the propagation can vary with time and a frequency offset.

Figure 3:
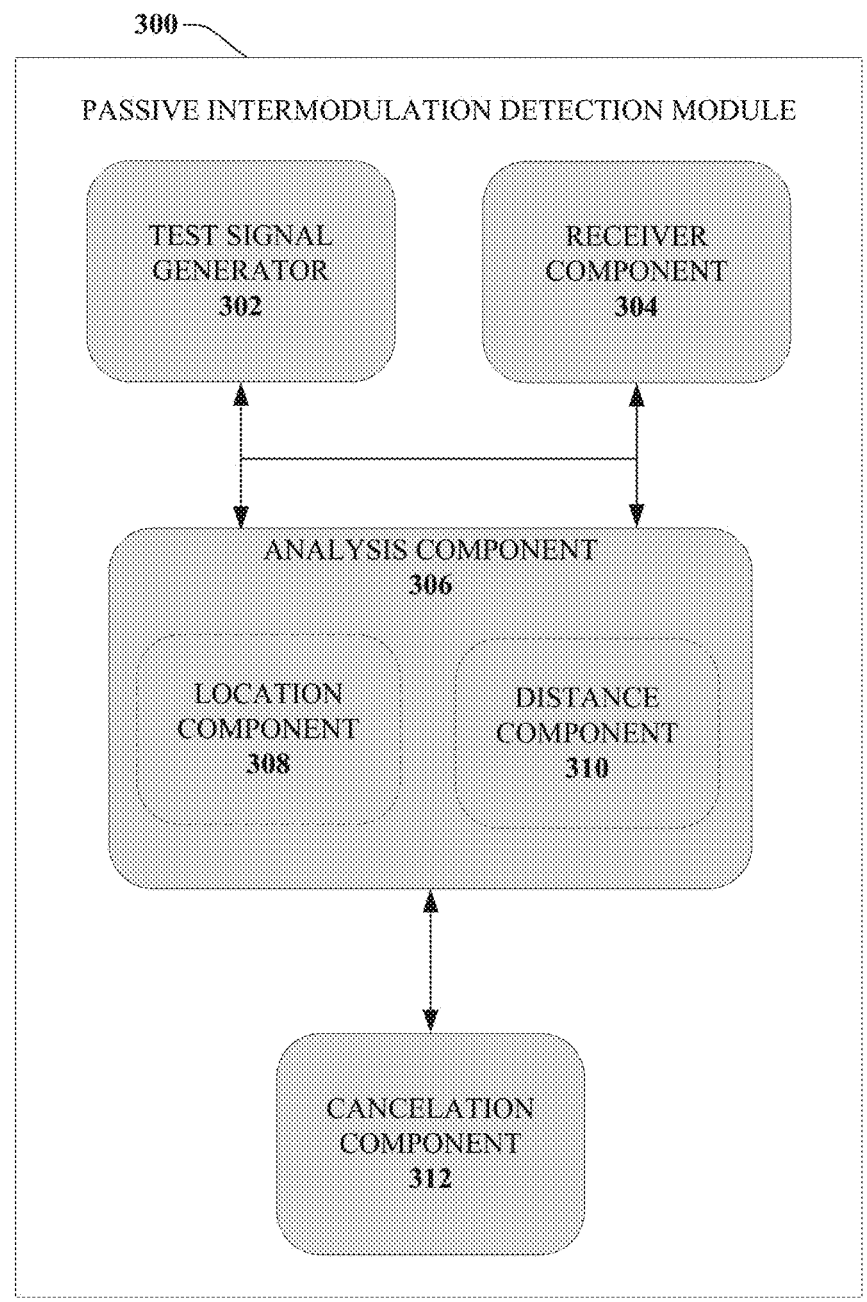
FIG. 3 illustrates an example wireless network performing passive intermodulation detection according to one or more embodiments.

Referring now to FIG. 3, illustrated is an example wireless network performing passive intermodulation detection according to one or more embodiments. A passive intermodulation detection module 300 can comprise test signal generator 302, a receiver component 304, an analysis component 306, and a cancellation component 312. The passive intermodulation detection component can generate a test signal that can be transmitted by an antenna and the receiver component 304 can receive, via another antenna, a transmission in a band from the test signal. The test signal can be in a downlink band, while the signal received by the receiver component 304 can be in an uplink band.

The analysis component 306 can comprise a location component 308 that can determine a rough location of the nonlinearity causing the passive intermodulation based on matching the passive intermodulation to a sector in which the test signal was transmitted. A distance component 310 can also determine a location of the source of nonlinearity based on a time delay between the intermodulation product received signal and the transmitted test signal. This time delay can be extracted by any number of approaches, one of which is to examine the phase vs. frequency characteristic of the Fourier Transform of the received intermodulation interference signal cross correlated with the transmitted signal during a maintenance window (when there are few if any signals being transmitted) and determine the relative time of the interference vs. the test signal. In some embodiments, a radial distance from the receiving antenna can be determined. This radial distance can be further refined by intermodulation source reception from other antennas such that intersection of radial distances from separated antennas may be used to further locate possible sources of interference.

In an embodiment, based on the estimated location of the source of the non-linearity and the measured intermodulation products, the analysis component can generate an intermodulation product model that can be used to mitigate or cancel the effects of intermodulation product in received signals via cancellation component 312. The cancellation component 312 can receive output from the analysis component 306. The cancellation component 312 can comprise a finite impulse response filter or an infinite impulse response filter to filter out products of the downlink band that were reflected back. The filtering tries to account for interference associated with a signal that might have been delay by hitting an object (i.e. a bolt). However, the interference could also have a frequency or time offset. White Gaussian Noise can also be added to the cancellation component 312 to assist with the modeling.

The cancellation component 312 can also comprise a learning filter, which can be a finite impulse response filter or an infinite impulse response filter. The error output coming from the other finite impulse response filter can be placed through this learning filter to ultimately converge with the previous finite impulse response filter. The learning filter can also account for a time delay because the propagation can vary with time.

Figure 4:
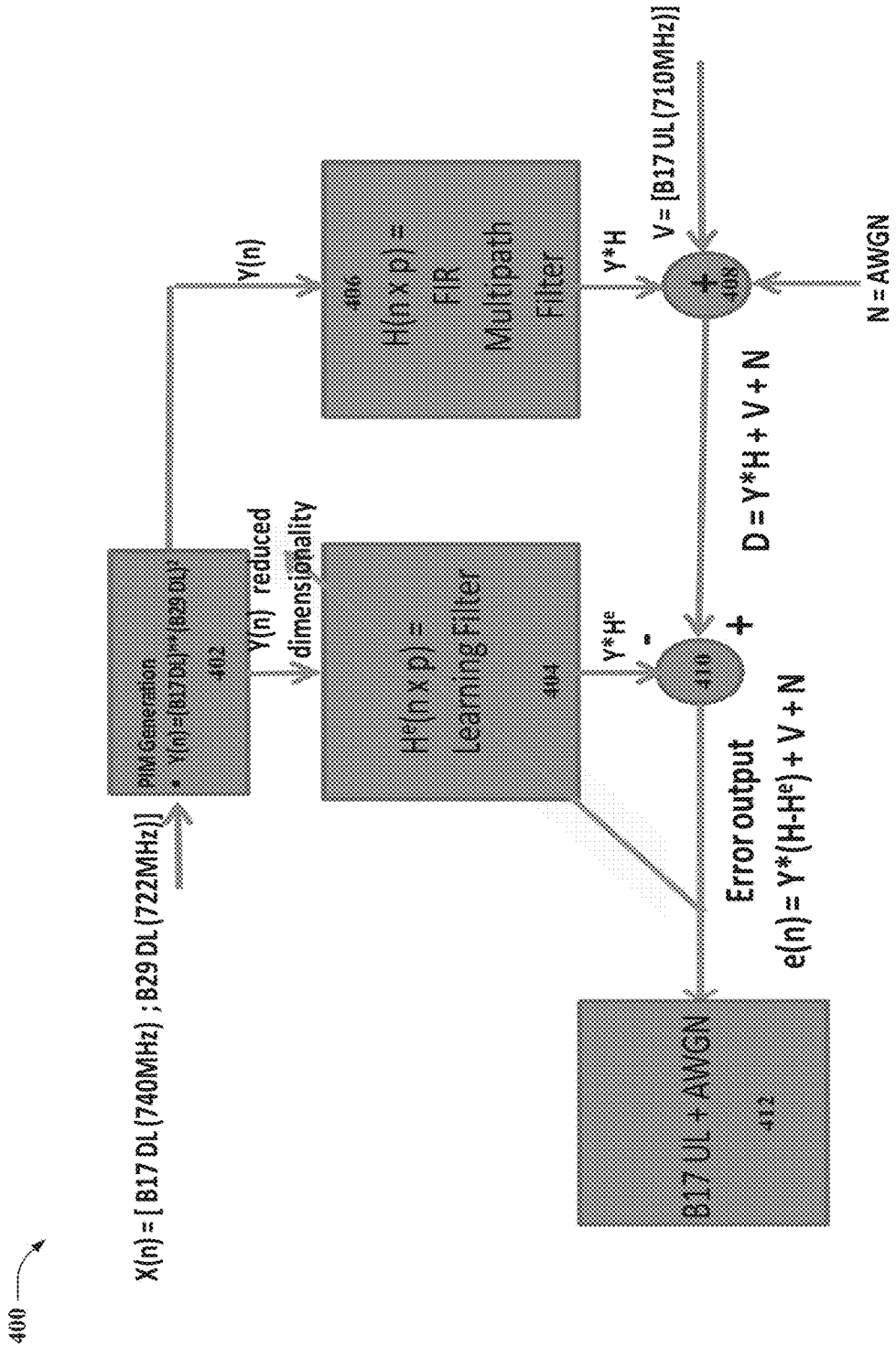
FIG. 4 illustrates an example wireless network performing passive intermodulation cancellation according to one or more embodiments.

Referring now to FIG. 4, illustrated is an example wireless network performing passive intermodulation cancellation according to one or more embodiments. Transmission signals (ie.: B17DL (740 MHz); B29DL (722 MHz)) comprising downlink bandwidths at various frequencies can be input into the passive intermodulation cancellation system 400 as PIM Generation at block 402. The transmission signals can be passed to a learning filter block 404 and a finite impulse response filter block 406 either simultaneously or one after the other. It should be noted that the intermodulation cancellation system 400 can also comprise an infinite response filter. The finite impulse response filter block 406 can represent the multipath products (i.e.: Y*H) of the downlink bands that were reflected back to account for interference coming back from the external PIM sources. The block 406 can output the products of the transmission signals that are added to a desired signal (i.e.: B17UL (710 MHz)) and is combined with Additive White Gaussian Noise (AWGN) to the transmission signal products at block 408. The result of this addition, as represented by FIG. 4, can be D=Y*H+V+N. Then the result (D) can be passed on to block 410 where the intermodulation interference is canceled by the output of the learning filter block 404 output (i.e.: Y*$H^e$), resulting in an error output (i.e.: Y*(H−$H^e$)+V+N) which can be used to drive the filter update equations. The desired signal, B17UL including the AWGN can be passed along to block 412 wherein the error output can be sent back through the learning filter block 404.

The learning filter block 404 can also be a finite impulse response filter or an infinite impulse response filter. The error output from block 410 can ultimately converge with the finite impulse response filter block 406 output. The learning filter block 404 can also account for a time delay because signal propagation can vary with time. Therefore the learning filter block 404 is adaptive and can be updated during each sampling period or less frequently.

Figure 5:
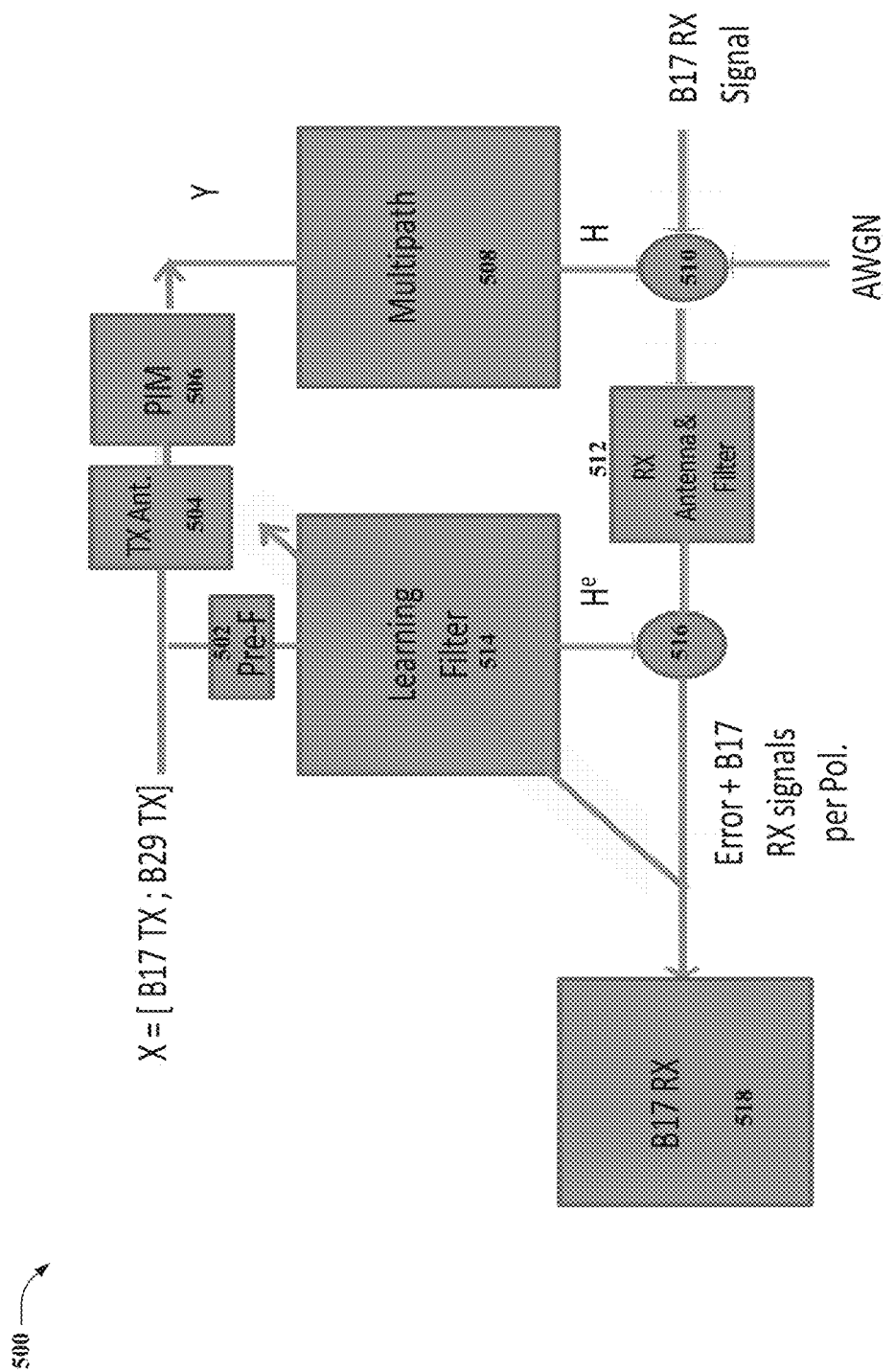
FIG. 5 illustrates an example wireless network performing passive intermodulation cancellation according to one or more embodiments.

Referring now to FIG. 5, illustrated is an example wireless network performing passive intermodulation cancellation according to one or more embodiments. Transmission signals (e.g.: B17TX; B29TX) comprising downlink bandwidths at various frequencies can be input into the passive intermodulation cancellation system 500. Prior to PIM Generation at block 506, the transmission signals can enter a pre-filter block 502 and be received by a transmission antenna 504. The pre-filter block 502 can model the uplink filters to reduce the dimensionality (or length) of the learning filter 514. The pre-filter block 502 can model a RX antenna and filter block 512. Thereafter, the transmission signals can be passed to the learning filter block 514 and a finite impulse response multipath filter block 508 either simultaneously or one after the other. It should be noted that the intermodulation cancellation system 500 can also comprise an infinite response filter. The finite impulse response filter block 508 can filter out products (i.e.: H) of the downlink bands that were reflected back to account for interference coming back from the signals. The finite impulse response filter block 508 can output the products of the transmission signals to be added to a desired signal (i.e.: B17RX) and Added White Gaussian Noise (AWGN) to the transmission signal products at block 510. The result of this addition, as represented by FIG. 5, can be received at a reception antenna and filter block 512. Then the result of the reception antenna and filter block 512 can be passed on to block 516 where it can be combined with the learning filter block 514 output (i.e.: $H^e$), resulting in an error output (i.e.: Error+B17 RX signals per Pol.). The desired signal, B17RX, can be passed along to block 518 wherein the error output can sent back through the learning filter block 514.

Figure 6:
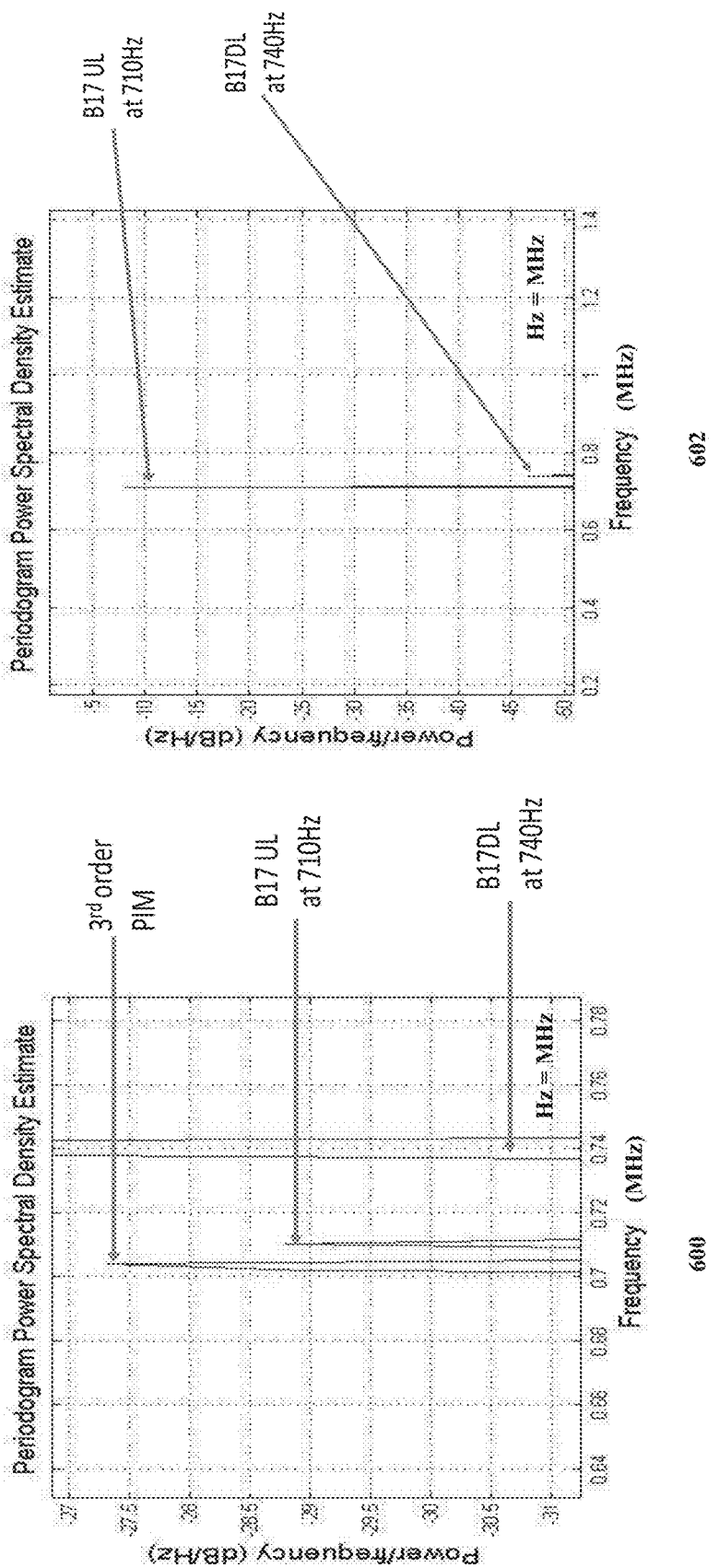
FIG. 6 illustrates example graphs of spectrum of error signals at various time samples according to one or more embodiments.

Referring now to FIG. 6, illustrated are example graphs of spectrum of error signals at various time samples according to one or more embodiments. Graph 600 represents a spectrum of error signal prior to being sampled. Therefore, the PIM can be represented at approximately 704 MHz, with an amplitude that is more than the uplink signal for band 17 at 710 MHz and less than the downlink B17 signal at 740 MHz. After convergence of the adaptive filter, as indicated by graph 602, the PIM in relation to the band 17 uplink at 710 MHz is virtually not observable.

Figure 7:
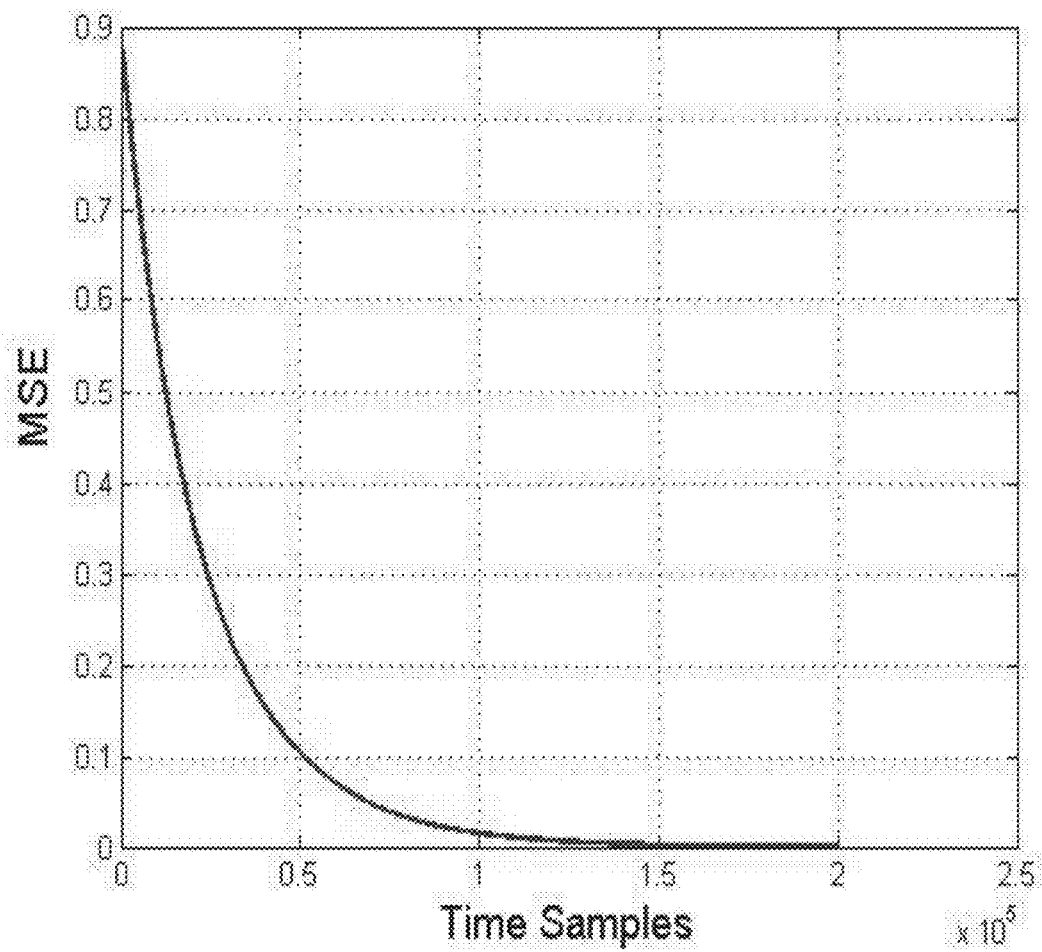
FIG. 7 illustrates an example convergence graph according to one or more embodiments.

Referring now to FIG. 7, illustrated is an example convergence graph according to one or more embodiments. The FIG. 7 graph illustrates a sample convergence of a mean squared estimate between the learning filter output products and the simulated finite impulse response multipath filter PIM output products. As the graph indicates, the mean squared estimate reduces as the time samples increase exponentially.

Figure 8:
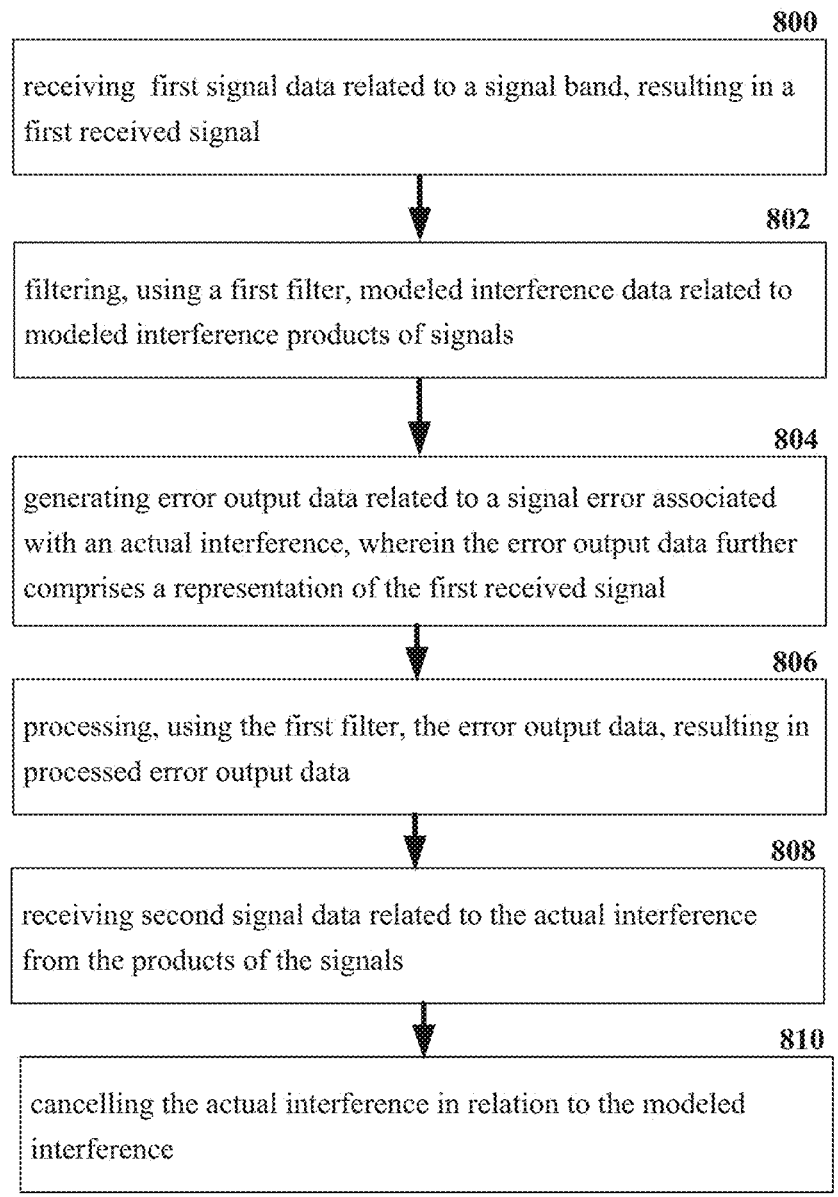
FIG. 8 illustrates an example schematic system block diagram for a method for performing passive intermodulation cancellation according to one or more embodiments.

Referring now to FIG. 8, illustrated is an example schematic system block diagram for a method for performing passive intermodulation cancellation according to one or more embodiments. At element 800, first signal data related to a signal band can be received, resulting in a first received signal. At element 802, modeled interference data related to modeled interference products of signals can be filtered using a first filter, and at element 804, error output data related to a signal error associated with an actual interference can be generated, wherein the error output data further comprises a representation of the first received signal. Thereafter, the error output data can be processed using the first filter at element 806, resulting in processed error output data. At element 808, second signal data related to the actual interference from the products of the signals can be received, and at element 810, the actual interference can be cancelled in relation to the modeled interference.

Figure 9:
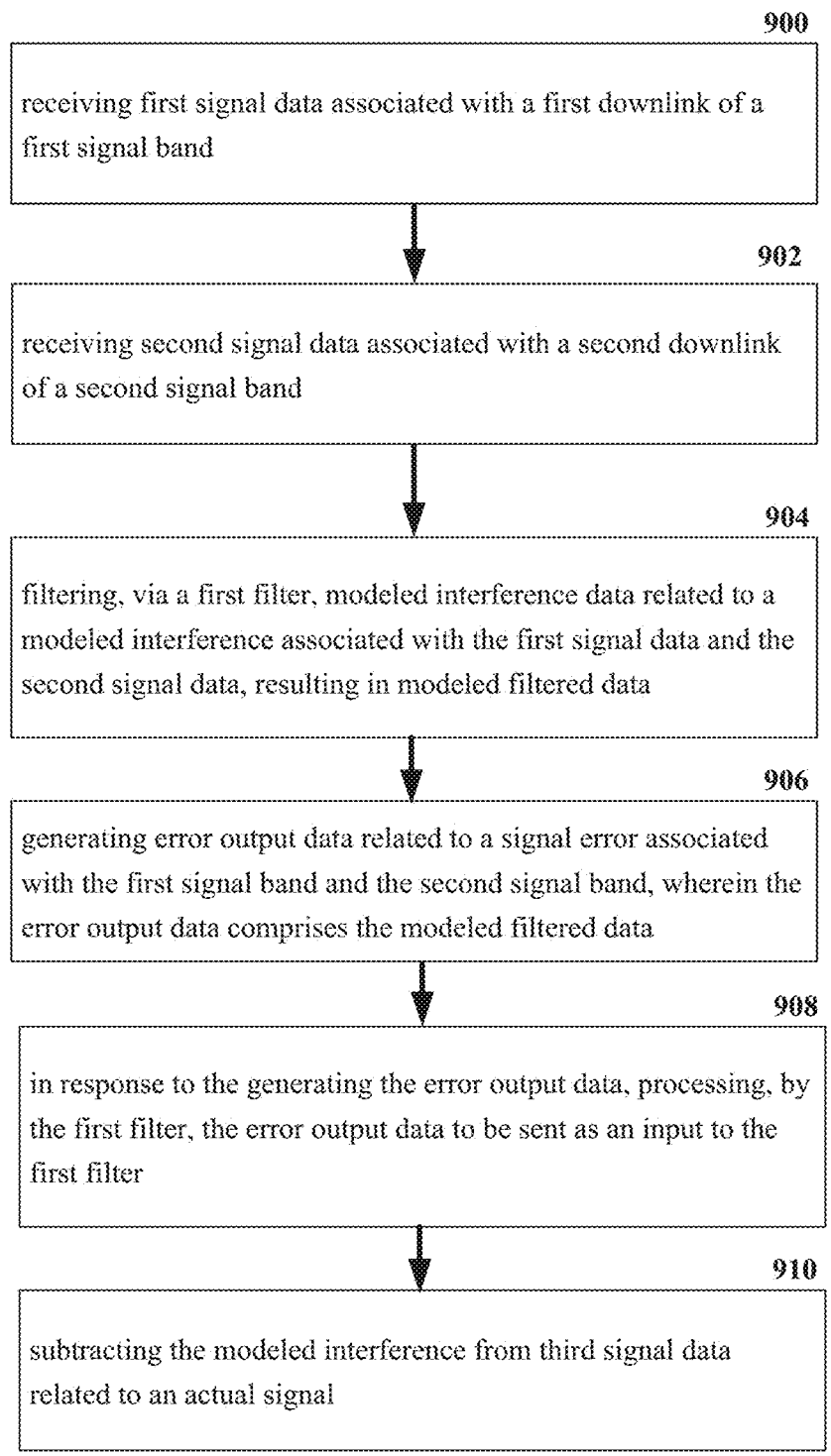
FIG. 9 illustrates an example schematic system block diagram for a system to perform passive intermodulation cancellation according to one or more embodiments.

Referring now to FIG. 9, illustrated is an example schematic system block diagram for a system to perform passive intermodulation cancellation according to one or more embodiments. At element 900, first signal data associated with a first downlink of a first signal band can be received, and at element 902, second signal data associated with a second downlink of a second signal band can be received. Consequently, modeled interference data related to a modeled interference associated with the first signal data and the second signal data can be filtered, resulting in modeled filtered data at element 904. At element 906, error output data related to a signal error associated with the first signal band and the second signal band can be generated, wherein the error output data comprises the modeled filtered data. In response to the generating the error output data at element 906, the error output data can be processed by the first filter at element 908 and sent as an input to the first filter. Thereafter, the modeled interference can be subtracted from third signal data related to an actual signal at element 910.

Figure 10:
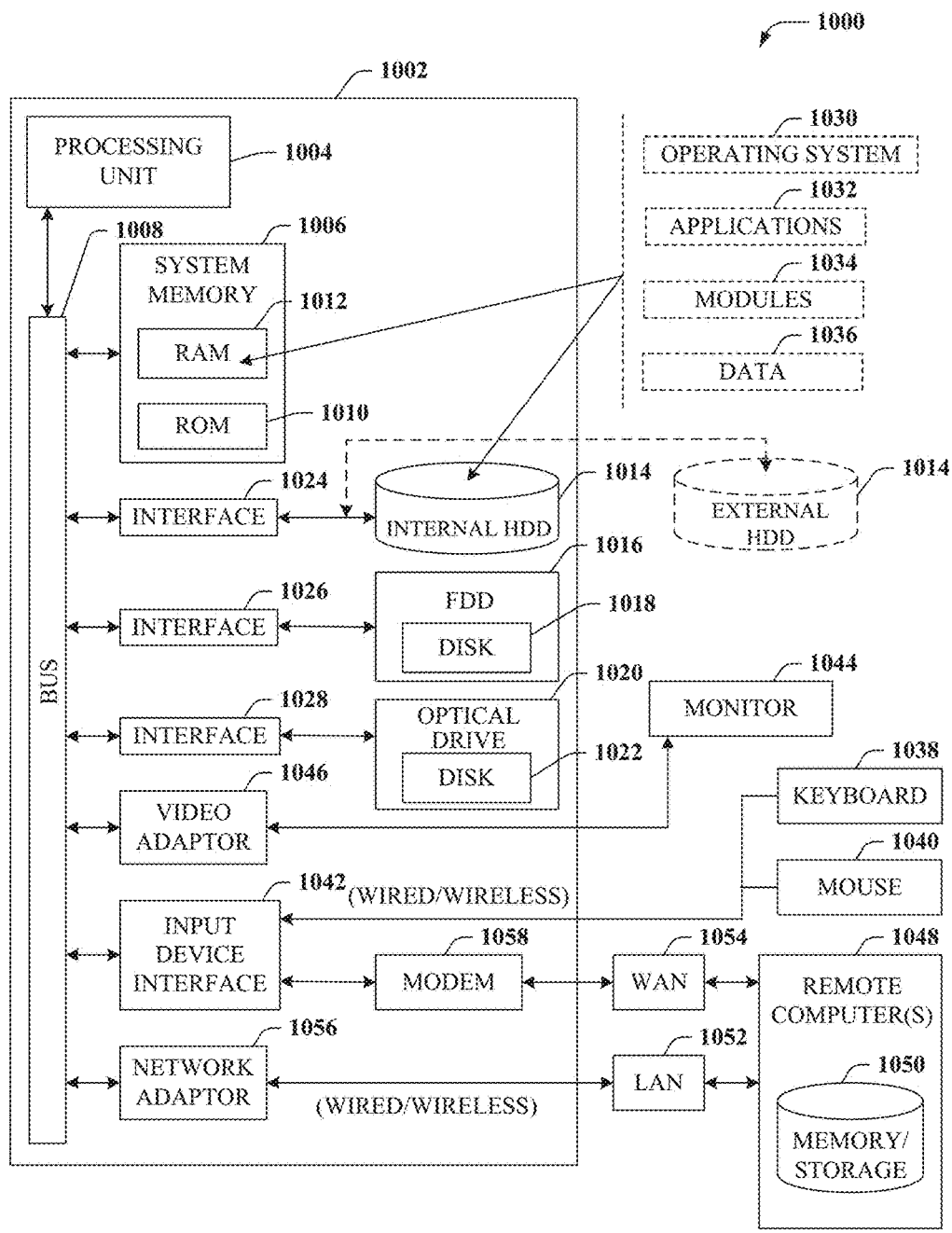
FIG. 10 illustrates an example schematic system block diagram of an example non-limiting embodiment of a computing environment in accordance with various aspects described herein.

Referring now to FIG. 10, illustrated is a block diagram of a computing environment in accordance with various aspects described herein. For example, in some embodiments, the computer can be or be included within the radio repeater system disclosed in any of the previous systems 200, 300, 400, and/or 500.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.1a) or 54 Mbps (802.11b) data rate, for example or with products that contain both bands (dual band), so the networks can provide real-world performance similar to the basic 10BaseT wired Ethernet networks used in many offices.

In an embodiment of the subject application, the computer 1002 can provide the environment and/or setting in which one or more of the passive intermodulation detection and cancellation systems disclosed in FIGS. 1-5 can be operated from. For instance, the virtual machines disclosed herein can be applications 1032 stored in hard drive 1014 and executed by processing unit 1004.

FIG. 1 illustrates an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication. Mobile network platform 1110 can also include the MMEs, HSS/PCRFs, SGWs, and PGWs disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider, for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

Figure 11:
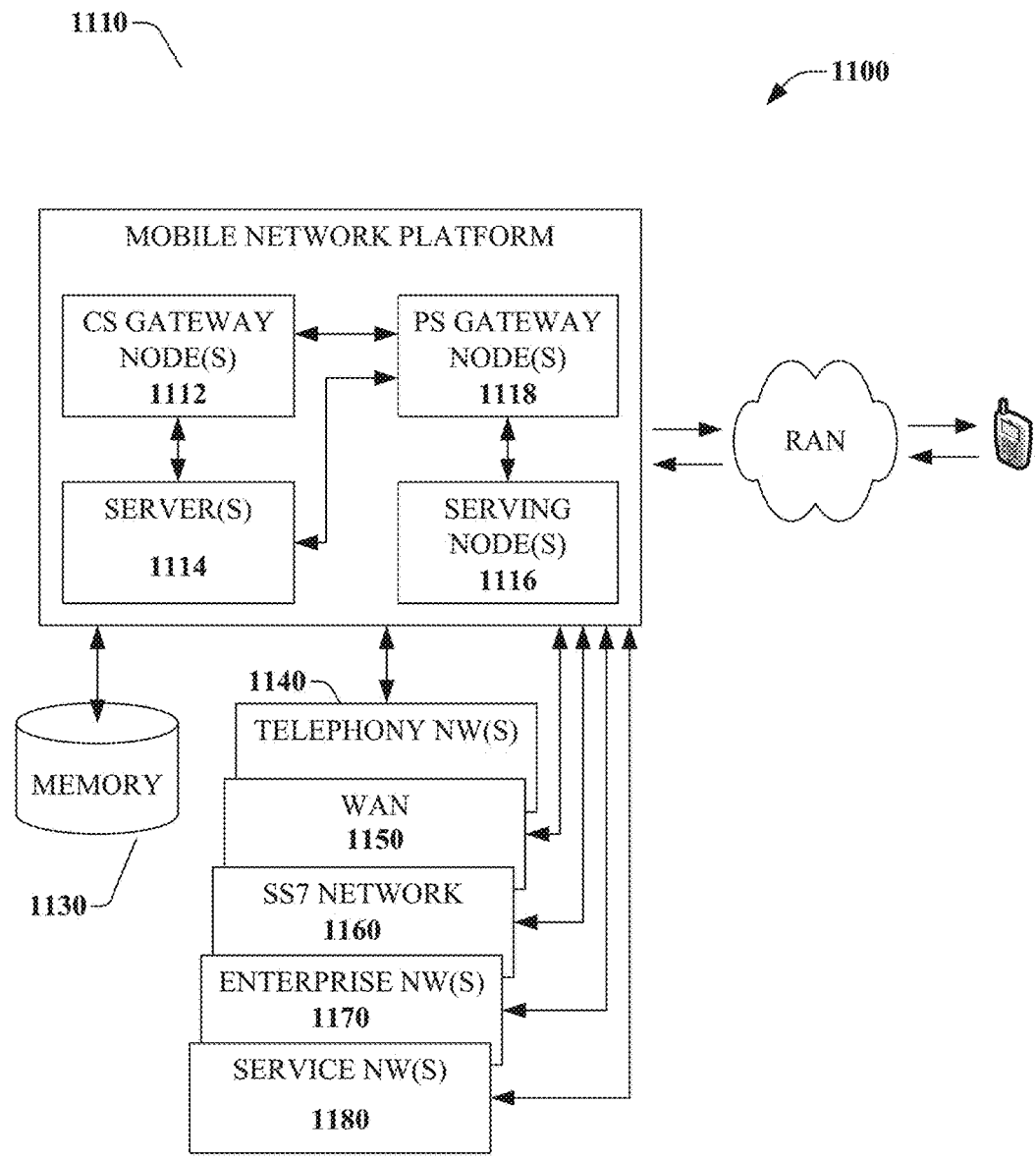
FIG. 11 illustrates an example block diagram of an example, non-limiting embodiment of a mobile network platform in accordance with various aspects described herein.

In order to provide a context for the various aspects of the disclosed subject matter, FIGS. 10 and 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

Furthermore, for future SDN (software defined networks) with NFV (network function virtualization), the cancellation can be in the form of a software module that can be implemented (or not if there is no PIM degradation) inside the virtualized RAN module. This can scale the approach to include PIM cancellation for PIM originating from multiple carrier interactions.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, field programmable gate array, graphics processor, or software defined radio reconfigurable processor and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs.

Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving, by a wireless network device comprising a processor, first signal data related to a signal band, resulting in a first received signal;
filtering, by the wireless network device using a first filter, modeled interference data related to modeled interference products of signals;
generating, by the wireless network device, error output data related to a signal error associated with an actual interference, wherein the error output data further comprises a representation of the first received signal;
processing, by the wireless network device using the first filter, the error output data, resulting in processed error output data; and
receiving, by the wireless network device, second signal data related to the actual interference from the products of the signals; and
cancelling, by the wireless network device, the actual interference in relation to the modeled interference.

2. The method of claim 1, wherein the signal band comprises constituent signal bands.

3. The method of claim 2, wherein the first signal data comprises a first downlink signal associated with a first signal band of the constituent signal bands and a second downlink signal associated with a second signal band of the constituent signal bands.

4. The method of claim 3, wherein the actual interference comprises products of the first signal band and the second signal band.

5. The method of claim 1, further comprising:
processing, by the wireless network device, an uplink signal associated with the actual interference resulting in the actual interference being canceled.

6. The method of claim 1, further comprising:
filtering, by the wireless device using a second filter, the modeled interference data, wherein the second filter is a finite impulse response filter.

7. The method of claim 1, further comprising:
receiving, by the wireless device, returned test signal data related to a returned test signal; and
in response to receiving the returned test signal data, generating location data related to a passive intermodulation source based on a time delay.

8. The method of claim 1, further comprising:
receiving, by the wireless device, returned test signal data related to returned test signals; and
in response to receiving the returned test signal data, determining a port associated with the interference.

9. A system, comprising:
a processor; and
a memory that stores executable instructions that, when executed by the processor, facilitate performance of operations, comprising:
receiving first signal data associated with a first downlink of a first signal band;
receiving second signal data associated with a second downlink of a second signal band;
filtering, via a first filter, modeled interference data related to a modeled interference associated with the first signal data and the second signal data, resulting in modeled filtered data;
generating error output data related to a signal error associated with the first signal band and the second signal band, wherein the error output data comprises the modeled filtered data;

in response to the generating the error output data, processing, by the first filter, the error output data to be sent as an input to the first filter; and subtracting the modeled interference from third signal data related to an actual signal.

10. The system of claim 9, wherein the error output data comprises second interference data related to a second interference.

11. The system of claim 9, wherein the operations further comprise:

remotely reconfiguring the system, via a software-defined network, resulting in a reconfigured system.

12. The system of claim 11, wherein the reconfigured system arranges system resources based on an environment factor or a third interference, wherein the third interference appears after an initial configuration.

13. The system of claim 12, wherein the operations further comprise:

adaptively addressing downlink amplifier nonlinearities to optimize performance.

14. The system of claim 13 wherein the operations further comprise:

based on a ranking associated with a test signal, successively filtering the modeled interference data, related to the modeled interference, resulting in an error reduction.

15. A non-transitory machine-readable storage medium, comprising executable instructions that, when executed by a processor, facilitate performance of operations, comprising:

receiving first signal data related to a signal band, resulting in a first received signal;

filtering, by a first filter, modeled interference data related to a modeled interference of the first received signal, resulting in first filtered data;

generating error output data related to a signal error associated with the modeled interference;

receiving second signal data associated with an actual signal to be input into the first filter; and in response to the receiving the second signal data, removing the first filtered data from the actual signal.

16. The non-transitory machine-readable storage medium of claim 15, wherein the operations further comprise:

canceling two intermodulation products of the second signal data simultaneously.

17. The non-transitory machine-readable storage medium of claim 16, wherein the two intermodulation products are a largest intermodulation products.

18. The non-transitory machine-readable storage medium of claim 15, wherein the first signal data is ranked based on a signal plus noise to interference ratio.

19. The non-transitory machine-readable storage medium of claim 18, wherein the first signal data is of a third order.

20. The non-transitory machine-readable storage medium of claim 15, wherein the first filter is an infinite impulse response filter.

* * * * *